(12) United States Patent
Ferguson et al.

(10) Patent No.: US 9,373,045 B1
(45) Date of Patent: *Jun. 21, 2016

(54) BUS DETECTION FOR AN AUTONOMOUS VEHICLE

(71) Applicant: Google Inc., Mountain View, CA (US)

(72) Inventors: David Ian Franklin Ferguson, San Francisco, CA (US); Wan-Yen Lo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,775

(22) Filed: Jan. 21, 2016

Related U.S. Application Data

(63) Continuation of application No. 14/208,385, filed on Mar. 13, 2014, now Pat. No. 9,280,710.

(51) Int. Cl.
*G06K 9/00* (2006.01)
*G06T 7/60* (2006.01)
*G06T 7/40* (2006.01)
*G06T 7/00* (2006.01)
*G05D 1/00* (2006.01)
*B60Q 1/26* (2006.01)

(52) U.S. Cl.
CPC .......... *G06K 9/00805* (2013.01); *G05D 1/0088* (2013.01); *G06K 9/00818* (2013.01); *G06T 7/0081* (2013.01); *G06T 7/408* (2013.01); *G06T 7/602* (2013.01); *G06T 2207/10024* (2013.01); *G06T 2207/20021* (2013.01); *G06T 2207/30261* (2013.01)

(58) Field of Classification Search
CPC .................................... G06K 9/00; G06T 7/00
USPC ............ 382/103, 104, 236; 340/433; 348/169
See application file for complete search history.

(56) References Cited

U.S. PATENT DOCUMENTS

| | | | |
|---|---|---|---|
| 8,655,537 B2 | 2/2014 | Ferguson et al. | |
| 8,930,059 B2* | 1/2015 | Neff | G05D 1/0231 180/167 |
| 9,280,710 B1* | 3/2016 | Ferguson | G06K 9/00791 |
| 2008/0162027 A1 | 7/2008 | Murphy et al. | |
| 2013/0261872 A1* | 10/2013 | Ferguson | G05D 1/00 701/28 |
| 2014/0012455 A1* | 1/2014 | Neff | G05D 1/0231 701/25 |

\* cited by examiner

*Primary Examiner* — Abolfazl Tabatabai
(74) *Attorney, Agent, or Firm* — McDonnell Boehnen Hulbert & Berghoff LLP

(57) ABSTRACT

Methods and systems are provided that may allow an autonomous vehicle to discern a school bus from image data. An example method may include receiving image data indicative of a vehicles operating in an environment. The image data may depict sizes of the vehicles. The method may also include, based on relative sizes of the vehicles, determining a vehicle that is larger in size as compared the other vehicles. The method may additionally include comparing a size of the determined vehicle to a size of a school bus and based on the size of vehicle being within a threshold size of the school bus, comparing a color of the vehicle to a color of the school bus. The method may further include based on the vehicle being substantially the same color as the school bus, determining that the vehicle is representative of the school bus.

20 Claims, 7 Drawing Sheets

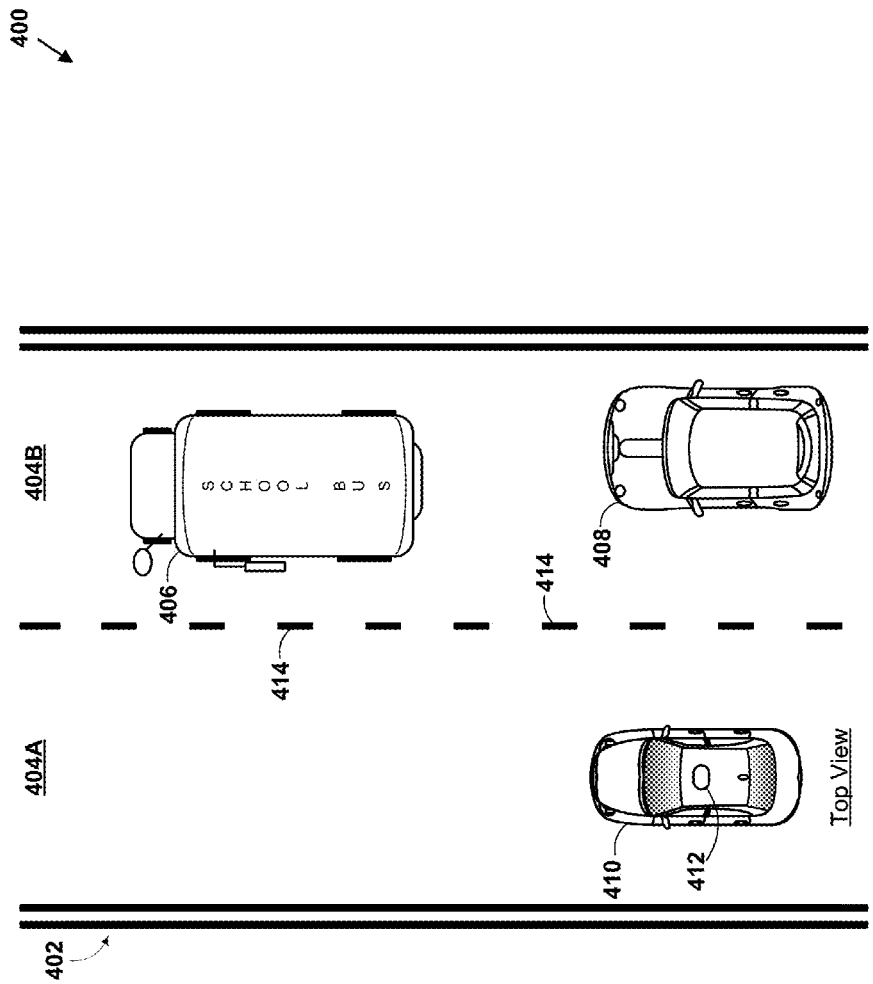

BUS DETECTION FOR AN AUTONOMOUS VEHICLE

CROSS-REFERENCE TO RELATED APPLICATION

The present application is a continuation of U.S. patent application Ser. No. 14/208,385, filed on Mar. 13, 2014, and entitled "Bus Detection for an Autonomous Vehicle," which is herein incorporated by reference as if fully set forth in this description.

BACKGROUND

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

For an autonomous vehicle, determining the presence of other vehicles that may be operating in proximity of the autonomous vehicle may be important in that the autonomous vehicle may need to alter its operation or maneuver in a certain manner due to the other vehicles' presence. For instance, an autonomous vehicle may operate differently in the presence of a school bus than it does normally. Beneficially, the methods and systems described herein may help an autonomous vehicle determine the presence of a school bus so that it may operate appropriately when in proximity of the school bus.

In a first aspect, a method is provided. The method may include receiving, using a computing device, image data indicative of one or more vehicles that are operating in an environment. The image data may depict sizes of respective vehicles of the one or more vehicles. The method may also include determining a vehicle from the one or more vehicles that substantially fills a bounding box without exceeding the bounding box. The method may additionally include comparing a size of the vehicle to information indicative of a size of a school bus. The method may further include based on the size of the vehicle being within a threshold size of the size of the school bus, comparing a color of the vehicle to a color of a given school bus. The method may even further include based on the vehicle being substantially the same color as the color of the given school bus, determining that the vehicle is representative of the given school bus.

In a second aspect, a vehicle is provided. The vehicle may include a computing system. The computing system may be configured receive image data indicative of one or more vehicles that are operating in an environment, the image data depicting sizes of respective vehicles of the one or more vehicles. The computing system may also be configured to determine a vehicle from the one or more vehicles that substantially fills a bounding box without exceeding the bounding box. The system may additionally be configured to compare a size of the vehicle to information indicative of a size of a school bus. The system may additionally be configured to based on the size of the vehicle being within a threshold size of the size of the school bus, compare a color of the vehicle to a color of a given school bus. The system may further be configured to based on the vehicle being substantially the same color as the color of the given school bus, determine that the vehicle is representative of the given school bus.

In a third aspect, a non-transitory computer readable medium having stored therein instructions that when executed by a computer system in a vehicle, cause the computer system to perform functions is provided. The functions may include receiving image data indicative of one or more vehicles that are operating in an environment. The image data may depict sizes of respective vehicles of the one or more vehicles. The functions may also include determining a vehicle from the one or more vehicles that substantially fills a bounding box without exceeding the bounding box. The functions may additionally include comparing a size of the vehicle to information indicative of a size of a school bus. The functions may further include based on the size of the vehicle being within a threshold size of the size of the school bus, comparing a color of the vehicle to a color of a given school bus. The functions may even further include based on the vehicle being substantially the same color as the color of the given school bus, determining that the vehicle is representative of the given school bus.

In a fourth aspect a system is provided. The system may include a means for receiving image data indicative of one or more vehicles that are operating in an environment. The image data may depict sizes of respective vehicles of the one or more vehicles. The system may also include a means for determining a vehicle from the one or more vehicles that substantially fills a bounding box without exceeding the bounding box. The system may additionally include a means for comparing a size of the vehicle to information indicative of a size of a school bus. The system may further include a means for based on the size of the vehicle being within a threshold size of the size of the school bus, comparing a color of the vehicle to a color of a given school bus. The system may even further include a means for based on the vehicle being substantially the same color as the color of the given school bus, determining that the vehicle is representative of the given school bus.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A illustrates an operating environment, according to an example embodiment.

DETAILED DESCRIPTION

Figure 1:
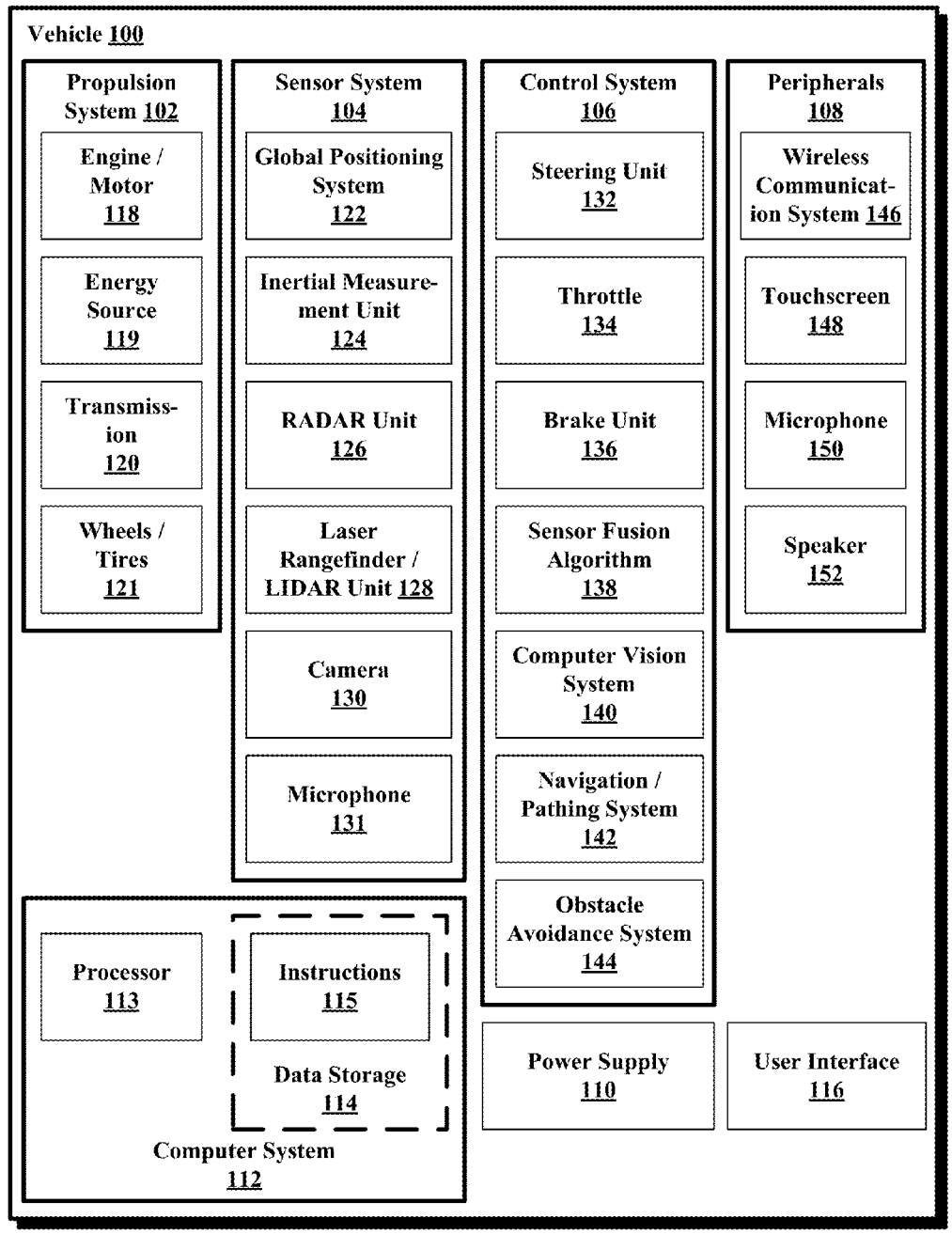
FIG. 1 illustrates a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

For vehicles operating in an autonomous mode, recognizing environmental properties or recognizing the presence of objects in an environment of the vehicle may be helpful. At a given moment autonomous vehicles may make driving decisions based on a variety of properties of a current traffic situation in the environment of the autonomous vehicle. Such properties may include the positions and velocities of other vehicles, the presence of cyclists and/or pedestrians, the state of traffic lights, and the types and sizes of other vehicles that are present in the environment. For example, an autonomous vehicle may need to make a driving decision based on the properties of an intersection in which the vehicle is traveling. Accordingly, for instance, the autonomous vehicle may determine to slow down in anticipation of a school bus because the rules for operating in an intersection with a school bus present may be different that when operating in an intersection where other, different vehicles are present. Within examples herein, methods and systems for an autonomous vehicle to detect school buses that are in the vicinity of the autonomous vehicle are described.

In an example scenario, an autonomous vehicle may receive, for example using a camera coupled to the vehicle, image data while the vehicle is traveling in a particular environment such as an environment with an intersection with other vehicles present in the intersection. In such a scenario, any vehicles that may be operating in the intersection that may be a school bus may be of import to the vehicle, and the vehicle would, ideally, like to efficiently and accurately detect the school bus so that it may operate appropriately (e.g., slow down or stop in an appropriate manner). Upon receiving the image data, the vehicle may compare a known size of a school bus to the other vehicles operating in the intersection. Based on the comparison, the vehicle may determine the presence of any vehicles operating in the intersection that may be within a threshold of the size of the school bus. The vehicle may further compare the vehicles within the threshold size of the school bus with a variety of features that may generally describe a school bus. Using the variety of features, the vehicle may determine whether any of the vehicles within the threshold size of a school bus may likely be an actual school bus. In some examples, upon completing this method, the autonomous vehicle may be provided instructions to operate in the environment.

Utilizing the methods and systems described herein may facilitate the task of detecting school buses by an autonomous vehicle. By taking advantage of the fact that all school buses may have similar sizes and features, vehicles that are not school buses may be more easily eliminated without having to, for example, construct or extract discriminating features of every vehicle that is in proximity of the autonomous vehicle. This may allow an autonomous vehicle to accurately and effectively detect school buses in a less computationally intensive manner.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
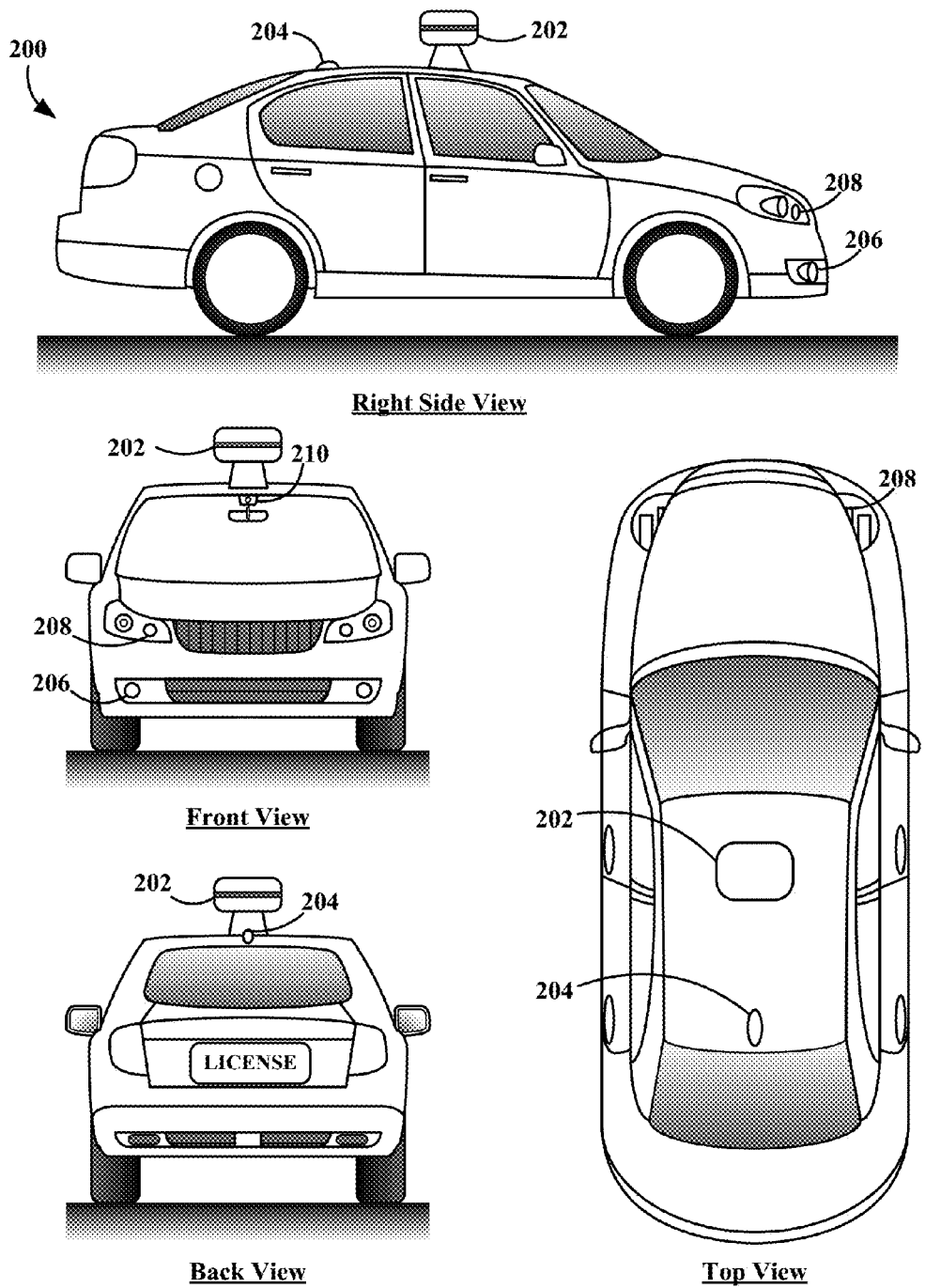
FIG. 2 illustrates a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may comprise infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
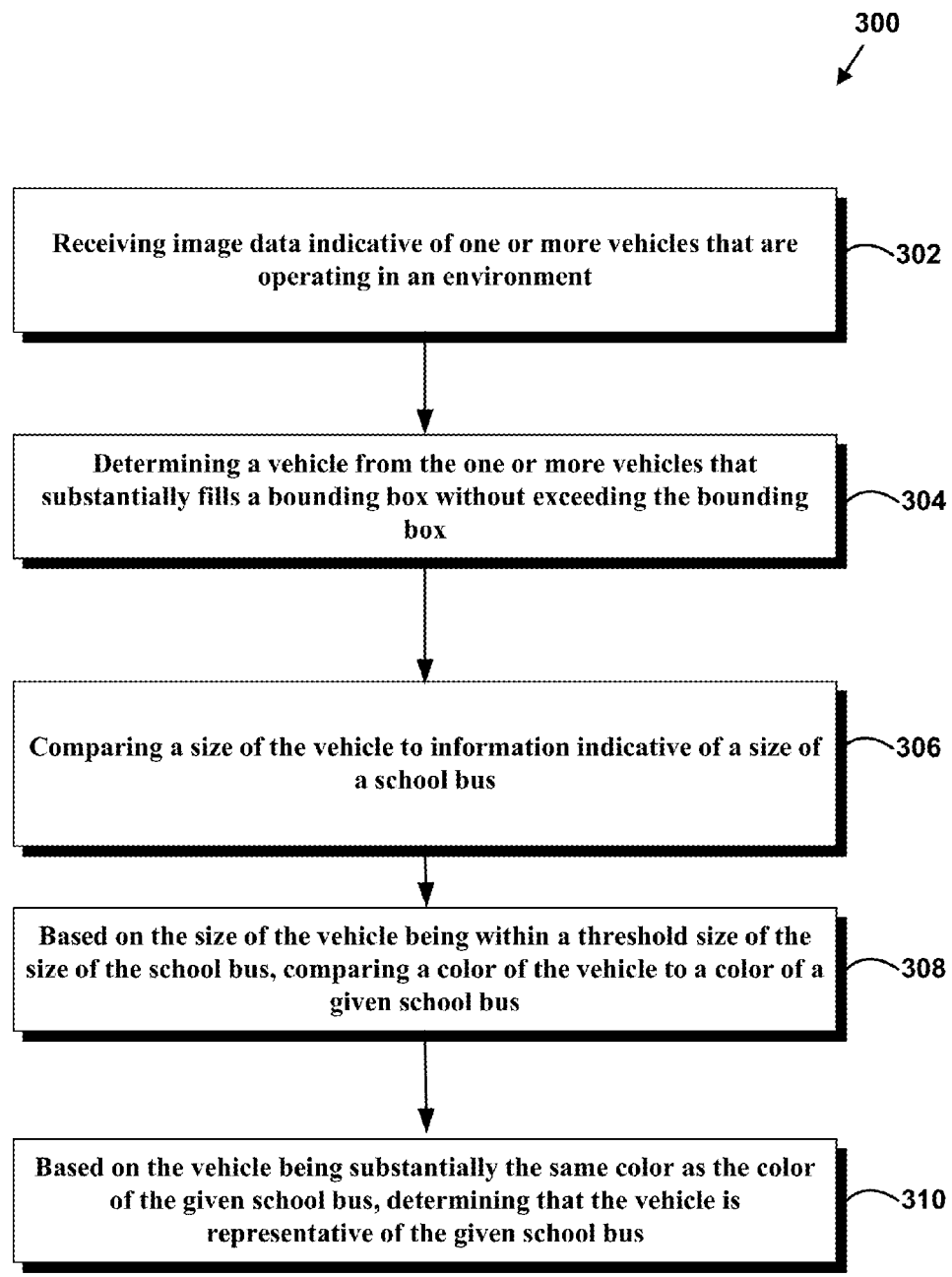
FIG. 3 illustrates a block diagram of a method, in accordance with an example embodiment.

Referring to FIG. 3, generally, method 300 may be employed by an autonomous vehicle to help detect complex objects in near real time. Complex objects may include any objects that may be present in image data and that may require a variety of templates to be described or identified due to the various complexities associated with the object. The complexities may include size variations and or part variations, for example. To help detect and identify complex objects and object parts "classifiers" may be used. Classifiers may be functions (e.g., computer executable functions) configured to identify object parts of a given complex object in image data based on discriminative feature characteristics of the object parts associated with the given complex object. The discriminative features may then be processed to determine whether a match exists between a known object and the detected complex-object. The matching may be based, for example, on imaging parameters including pixel intensities and/or other image parameters. In some embodiments, a cascade (plurality) of successive classifiers may be used to help detect a complex object.

In FIG. 3, a method 300 is provided that may help an autonomous vehicle operating in an environment to efficiently and accurately detect a complex object such as a school bus that may also be operating in the environment, in accordance with an example embodiment. The autonomous vehicle described in this method may be vehicle 100 and/or vehicle 200 as illustrated and described in reference to FIGS. 1 and 2, respectively, or components of the vehicle 100 or vehicle 200. For example, the processes described herein may be carried out by RADAR unit 126, LIDAR unit 128, and/or camera 130 mounted to an autonomous vehicle (e.g., vehicle 200) in communication with computer system 112, sensor fusion algorithm 138, and/or computer vision system 140.

Furthermore, it is noted that the functionality described in connection with the flowcharts described herein can be implemented as special-function and/or configured general-function hardware modules, portions of program code executed by a processor (e.g., the processor 113 in computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Initially, at block 302, method 300 of FIG. 3 includes receiving image data indicative of one or more vehicles that may be operating in an environment. At block 302, an autonomous vehicle may be operating in the environment and while operating, may receive or obtain (e.g., using an image based detector) the image data. As previously noted, the vehicle may be the vehicle described in reference to FIGS. 1 and 2 and may be configured to operate in an autonomous mode in the environment. The environment may be any environment in which the vehicle may operate autonomously. For instance, as shown in FIG. 4A, an autonomous vehicle 410 may be operating in an environment that may include a road 402 with lanes of travel 404A, 404B, two other vehicles 406, 408 and a plurality of lane markers 414.

Figure 4B:
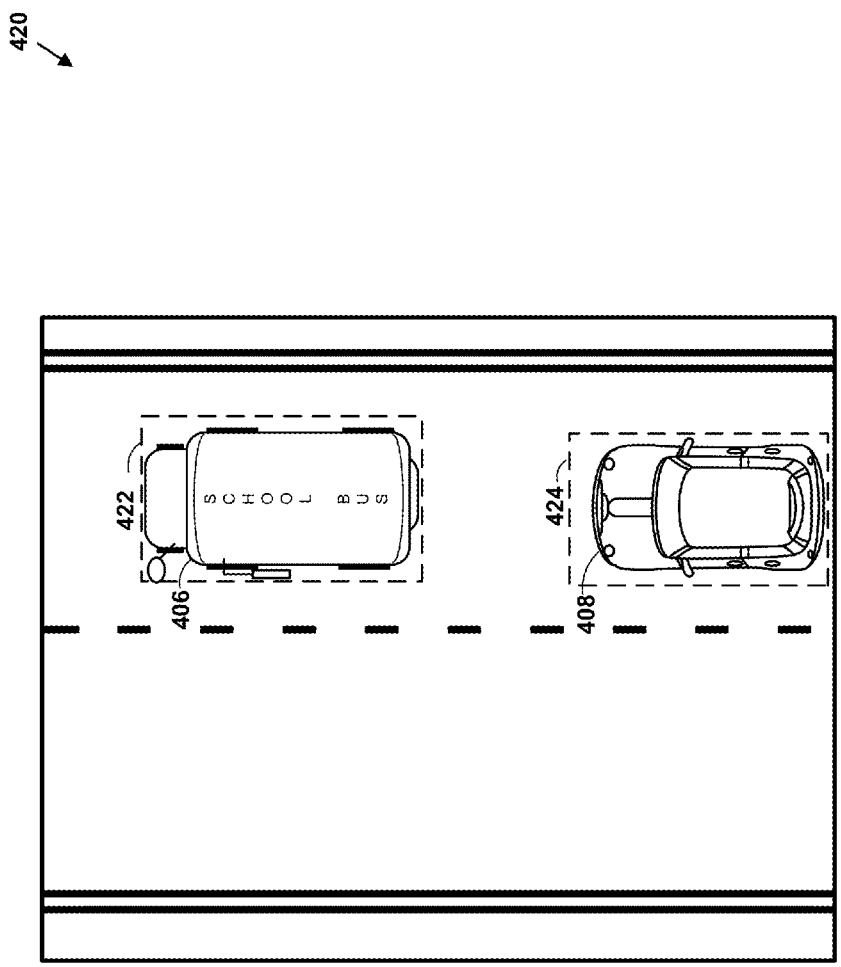
FIG. 4B illustrates an operating scenario, according to an example embodiment.

The image data may include any data indicative of environment 400 including data that depicts sizes of respective vehicles of the one or more vehicles. The image data may encompass various types of data, may be of various file formats, and may be stored to various mediums, whether those types of data, file formats, and mediums are known or have yet to be developed. For example, the image data may include one or more digital photographs or one or more digital graphics that may represent environment 400. Accordingly, the image data may include for example data that depicts the road 402, the other vehicles 406, 408, and the plurality of lane markers 414. An example of the image data is shown as image data 420 in FIG. 4B. As shown in FIG. 4B, image data 420 may include the foregoing aspects of environment 400.

Note in FIG. 4B, vehicle 410 is not shown because the scenario described with respect to method 300 vehicle 410 obtained the image data while operating in environment 400. However, in other examples, image data 420 may include data indicative of the presence of vehicle 410.

To obtain the image data, vehicle 410 may be continuously scanning environment 400 as the vehicle 402 operates in the environment. The vehicle may utilize a large number of scans of the environment or periodic scans of the environment using various sensors when obtaining the image data. Successive scans may be multiple scans by various sensors occurring over time and may be continuous or may occur in intervals. For example, the image data obtained in environment 400 may be obtained using sensor system 412 utilizing successive scans every few milliseconds as vehicle 410 operates in environment 400. In other examples, some or all of the image data may be received by the vehicle from another entity such as another vehicle that may be operating in the environment. In yet further examples, a portion of the image data may be received from another entity and another portion of the image data may be obtained by autonomous vehicle 410.

At block 304, method 300 includes determining a vehicle from the one or more vehicles that substantially fills a bounding box without exceeding the bounding box. For example, vehicle 410 may compare one or both of the other vehicles in the environment such as vehicles 406 and 408 to a pre-determined bounding box. The comparison may be made, for example, using a computer system similar to or the same as computer system 112 as described in FIG. 1.

In one example, the comparison may be made by processing the image data 420 using a function that may approximate bounding boxes for all of the vehicles in the image data. Accordingly, vehicle 410 may employ a function that may approximate a size of vehicle 406 using bounding box 422 and may approximate a size of vehicle 408 using bounding box 424, as shown in the scenario illustrated in FIG. 4B. Approximating the size of vehicles 406 and 408 may, for example, include superimposing a box or outline over the image data that substantially corresponds to the size of the vehicle as depicted in the image data. The outline may be determined based on data received from various sensors of vehicle 410 such as a RADAR or LIDAR, for example. Within the context of this disclosure, substantially may include being exact and/or being one or more deviations from exact. For example, a bounding box may be within one to three inches of the actual (i.e., exact) measurements of the vehicle to which the box corresponds.

Using the approximated bounding boxes, vehicle 410 may, for example, determine whether vehicle 406 and/or vehicle 408 fit within the pre-determined bounding box without exceeding the pre-determined bounding box. For example, vehicle 410 may determine that bounding box 422 and 424 both fit within the pre-determined bounding box (not shown in FIG. 4B). Accordingly, vehicle 410 may determine both vehicle 406 and vehicle 408 may each be a candidate school bus. Any vehicles that may have been determined to be larger than or exceed the pre-determined bounding box may be filtered out as being candidates of a school bus.

Note, comparing the sizes of the vehicles in the manner described above is an example only and is not intended to be limiting. Other means may exist to approximate the sizes of the vehicles and may be used in method 300.

After filtering out vehicles that cannot be a potential school bus, method 300 at block 306 includes comparing a size of the vehicle to information indicative of a size of a school bus. To make the comparison, vehicle 410 may utilize any generally known information that may provide for sizing associated with school buses. For instance vehicle 410 may utilize known school bus templates or descriptions of a given school bus. In one example, the comparison may be made to 35-40 feet long school bus, which may be the average length of a given school bus. Similar to the comparison performed at block 304, the determination made at block 306 may be performed using a computer system the same as or similar to that of computer system 112.

Making such a comparison may allow vehicle 410 to further determine whether the vehicles 406 and 408 are representative of a school bus. In other words, the determination my allow vehicle 410 to further filter out vehicles 406 and 408 if either is too small to be a candidate for a school bus despite having fit within the pre-determined threshold. For example, again referring to the scenario depicted in FIG. 4B, vehicle 410 may determine that vehicle 406 is within a threshold size of a known template for a given school bus and may therefore continue method 300 to further determine whether vehicle 406 is in fact a school bus. Conversely, vehicle 410 may determine that the size of vehicle 408 is not within a threshold size of the known template of the given school bus and, accordingly, vehicle 410 may filter out vehicle 408 as a potential candidate for a school bus.

Based on the size of the first vehicle being within a threshold size of the size of the school bus, method 300 continues at block 308, which includes comparing a color of the first vehicle to a color of a given school bus. The color chosen for comparison may be a substantially orange color so as to allow for the detection of orange regions that may generally be found on a given school bus (e.g., such as the known template), and in other cases may be a substantially non-orange color for the detection of the non-orange regions that may generally be found on a given school bus such as the wheels of the bus or the various "SCHOOL" signs that may be demarcated on the bus. Comparing various colors associated with the first vehicle to various known colors associated with the given school bus may further increase the confidence that the detected vehicle is representative of a school bus. Similar to the comparison made at block 304, the comparison may be made using a computer system similar to or the same as computer system 112 as described in FIG. 1.

In some embodiments, comparing a color of the first school bus to a color of the given school bus may include determining a portion of the image data that depicts the first vehicle, dividing the portion of the image data into a plurality of sections, and for respective sections of the plurality of sections, determining a value of difference between a color of the respective section and a substantially orange color. The color comparison may be made for example by computing the difference between two pixels in a region. The difference between the two pixels may be computed in all three color channels: red, green, and blue, for example. Other methods and computational algorithms may be used to compute the color difference. Thereafter, a determination may be made of a number of sections of the respective sections of which the value of difference is less than a difference threshold, and based on the number of sections of the respective sections being greater than a number threshold, it may be determined that the first vehicle is representative of the given school bus. Accordingly then, in some examples, at block 310 method 300 includes based on the first vehicle being substantially the same color as the color of the given school bus, determining that the first vehicle is representative of the given school bus.

Alternatively, in other examples, comparing size and color associated with the first vehicle may not be enough to verify whether the vehicle is representative of a school bus. Accordingly, additional classifiers may be applied to the first vehicle. These other classifiers may be applied as needed to increase the confidence that the first vehicle is representative of a school bus.

In one example, a classifier may be applied that may help determine the presence of a stop-sign. Based on portions of the image data including data indicative of a stop-sign, the confidence level that the vehicle is representative of the school bus may be increased. In another example, a classifier may be applied that may help determine the presence of a "SCHOOL" sign. Within the context of this disclosure, a "SCHOOL" sign may be any writings or signs on a given school bus that are indicative of the fact that the bus is a school bus. Based on the presence of the "SCHOOL" sign, the confidence level that the vehicle is representative of the school bus may be increased. To make the determine the presence of a particular sign, for example, a histogram of gradients may be applied, which may compute the value of gradients in different directions and thereby may allow for the detection of certain corners, edges (e.g., windows), or parts, for example.

In yet further examples, a classifier may be applied to the image data that may determine a specific operation of the vehicle and based on the data indicate of the specific operation the confidence level that the vehicle is representative of the school bus may be increased. For instance, the image data may include data indicative of a stop pattern of the vehicle. Based on the stop pattern of the vehicle, it may be determined the vehicle is representative of the school bus. Example data indicative of the stop patterns may include data indicative of where the vehicle is stopped on the road, data indicative of a presence of flashing lights, or data indicative of the presence of pedestrians, for example.

Within examples, some of the foregoing classifiers may be applied to help verify whether the vehicle is a bus. For instance, the foregoing classifiers may be applied as a cascade of classifiers and as each classifier is applied, the confidence that the vehicle is representative of a bus may be improved or the vehicle may be thrown out as a candidate.

Figure 4C:
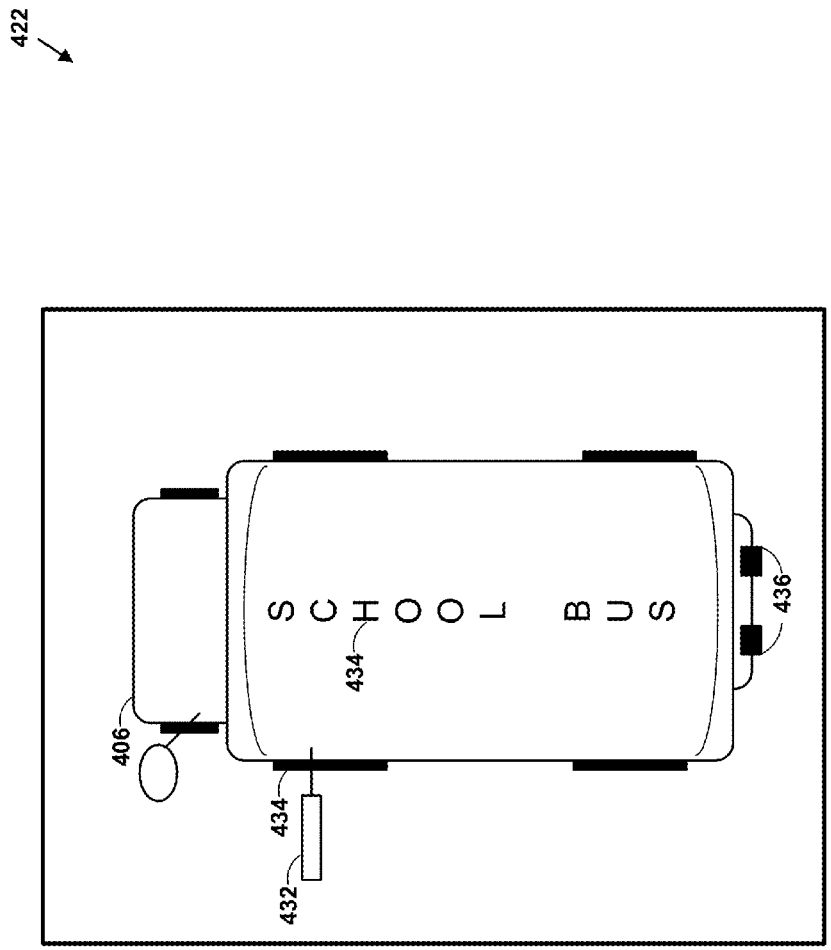
FIG. 4C illustrates image data in which discriminating features for a complex object have been determined, according to an example embodiment.

FIG. 4C illustrates image data 422 from which discriminative features have been determined using classifiers in attempt to help vehicle 410 determine vehicle 406 is representative of a school bus. As shown in FIG. 4C, vehicle 410 has determined three discriminating features that may help increase a confidence of vehicle 410 that vehicle 406 is representative of a bus: a stop-sign 432, a "SCHOOL" sign 434, and a flashing lights 436. Based on these features, vehicle 410 may determine vehicle 406 is representative of a school bus. It should be appreciated, however, that a wide variety of discriminating features may be determined to help determine whether vehicle 406 is representative of a school bus and that the features depicted in FIG. 4C are simply well suited examples that may be used.

In some examples describe herein, upon determining the vehicle is representative of a school bus, an autonomous vehicle may receive instructions and be controlled to operate based on the presence of the school bus. For instance, vehicle 410 may receive instructions to operate more cautiously and to detect the presence of a stop sign and/or pedestrians. Other instructions are possible and may be provided to vehicle 410.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
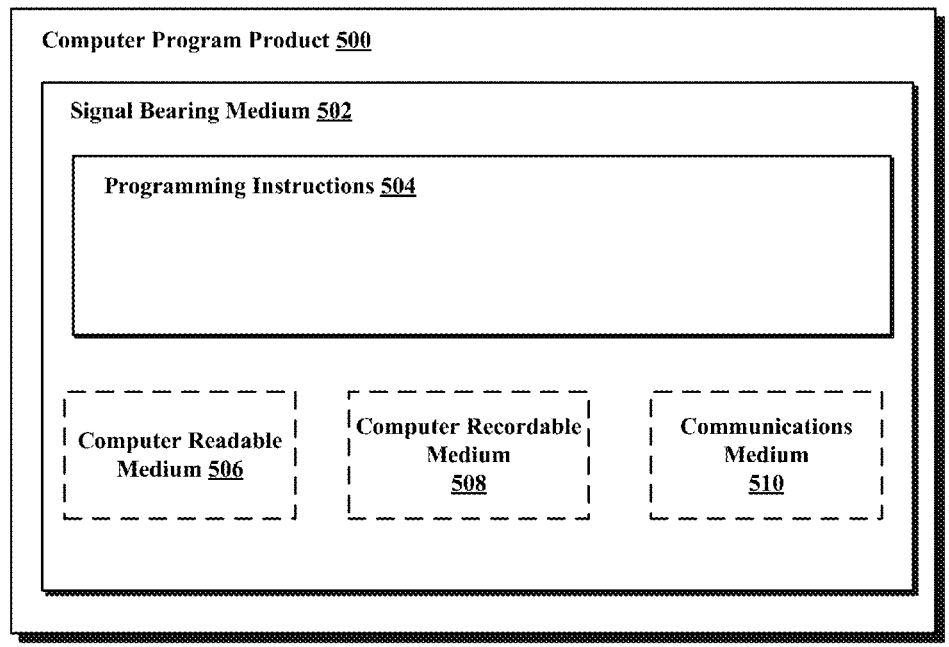
FIG. 5 illustrates a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
using, by one or more processors of a computing device, image data indicative of one or more vehicles in an environment to select a vehicle from the one or more vehicles to be a candidate school bus;
based on the selection of the vehicle to be the candidate school bus, the one or more processors comparing an estimated size of the vehicle to information indicative of a size of a school bus;
based on the estimated size of the vehicle being within a threshold size of the size of the school bus, the one or more processors comparing a color of the vehicle to a color of a given school bus; and
based on the vehicle being substantially the same color as the color of the given school bus, the one or more processors determining that the vehicle is representative of the given school bus.

2. The method of claim 1, wherein comparing the color of the vehicle to the color of the school bus comprises:
determining a portion of the image data that depicts the vehicle;
dividing the portion of the image data into a plurality of sections;
for respective sections of the plurality of sections, determining a value of difference between a color of the respective section and a substantially orange color; and
determining a number of sections of the respective sections of which the value of difference is less than a difference threshold,
wherein determining that the vehicle is representative of the given school bus is further based on the number of sections of the respective sections being greater than a number threshold.

3. The method of claim 1, further comprising:
the one or more processors determining a portion of the image data that depicts the vehicle; and
the one or more processors determining that the portion of the image data includes data indicative of a stop-sign,
wherein determining that the vehicle is representative of the given school bus is further based on the portion of the image data including data indicative of the stop-sign.

4. The method of claim 1, further comprising:
the one or more processors determining a portion of the image data that depicts the vehicle; and
the one or more processors determining that the portion of the image data includes data indicative of a school-sign,
wherein determining that the vehicle is representative of the given school bus is further based on the portion of the image data including data indicative of the school-sign.

5. The method of claim 1, further comprising:
the one or more processors receiving operational data indicative of an operation of the vehicle in the environment,
wherein determining that the vehicle is representative of the given school bus is further based on the operational data.

6. The method of claim 5, wherein the operational data indicative of the operation of the vehicle in the environment comprises data indicative of a stop pattern of the vehicle, and
wherein determining that the vehicle is representative of the given school bus based on the operational data comprises determining that the vehicle is representative of the given school bus based on the data indicative of the stop pattern of the vehicle.

7. The method of claim 6, wherein the data indicative of stop pattern includes data indicative of the vehicle operating a component of the vehicle to extend from a side portion of the vehicle as the vehicle stops.

8. The method of claim 1, wherein the computing device resides in an autonomous vehicle operating in the environment, the method further comprising:
based on the vehicle being representative of the given school bus, the one or more processors providing instructions to control the autonomous vehicle in the environment.

9. The method of claim 1, wherein using the image data indicative of the one or more vehicles in the environment to select the vehicle from the one or more vehicles to be the candidate school bus comprises:
using the image data to determine that the vehicle substantially fills a predetermined bounding box without exceeding the predetermined bounding box; and
based on the determination that the vehicle substantially fills the predetermined bounding box without exceeding the predetermined bounding box, selecting the vehicle to be the candidate school bus.

10. An autonomous vehicle comprising:
a computer system configured to:
use image data indicative of one or more vehicles in an environment of the autonomous vehicle to select a vehicle from the one or more vehicles to be a candidate school bus;
based on the selection of the vehicle to be the candidate school bus, compare an estimated size of the vehicle to information indicative of a size of a school bus;
based on the estimated size of the vehicle being within a threshold size of the size of the school bus, compare a color of the vehicle to a color of a given school bus; and
based on the vehicle being substantially the same color as the color of the given school bus, determine that the vehicle is representative of the given school bus.

11. The autonomous vehicle of claim 10, further comprising at least one sensor configured to sense the environment of the autonomous vehicle, wherein the computer system is further configured to:
before using the image data, use the at least one sensor to determine the image data.

12. The autonomous vehicle of claim 10, wherein the computer system is further configured to:
determine a portion of the image data that depicts the vehicle; and
determine that the portion of the image data includes data indicative of a stop-sign,
wherein determining that the vehicle is representative of the given school bus is further based on the portion of the image data including data indicative of the stop-sign.

13. The autonomous vehicle of claim 10, wherein the computer system is further configured to:
determine a portion of the image data that depicts the vehicle; and
determine that the portion of the image data includes data indicative of a school-sign,
wherein determining that the vehicle is representative of the given school bus is further based on the portion of the image data including data indicative of the school-sign.

14. The autonomous vehicle of claim 10, wherein the computer system is further configured to:
receive operational data indicative of an operation of the vehicle in the environment,
wherein determining that the vehicle is representative of the given school bus is further based on the operational data.

15. The autonomous vehicle of claim 14, wherein the operational data indicative of the operation of the vehicle in the environment comprises data indicative of a stop pattern of the vehicle,
wherein the stop pattern includes data indicative of the vehicle operating a component of the vehicle to extend from a side portion of the vehicle as the vehicle stops, and
wherein determining that the vehicle is representative of the given school bus based on the operational data comprises determining that the vehicle is representative of the given school bus based on the data indicative of the stop pattern of the vehicle.

16. The autonomous vehicle of claim 10, wherein using the image data indicative of the one or more vehicles in the environment to select the vehicle from the one or more vehicles to be the candidate school bus comprises:
using the image data to determine that the vehicle substantially fills a predetermined bounding box without exceeding the predetermined bounding box; and
based on the determination that the vehicle substantially fills the predetermined bounding box without exceeding the predetermined bounding box, selecting the vehicle to be the candidate school bus.

17. A non-transitory computer readable medium having stored therein instructions, that when executed by a computer system, cause the computer system to perform functions comprising:
using image data indicative of one or more vehicles in an environment to select a vehicle from the one or more vehicles to be a candidate school bus;
based on the selection of the vehicle to be the candidate school bus, comparing an estimated size of the vehicle to information indicative of a size of a school bus;
based on the estimated size of the vehicle being within a threshold size of the size of the school bus, comparing a color of the vehicle to a color of a given school bus; and
based on the vehicle being substantially the same color as the color of the given school bus, determining that the vehicle is representative of the given school bus.

18. The non-transitory computer readable medium of claim 17, wherein using the image data indicative of the one or more vehicles in the environment to select the vehicle from the one or more vehicles to be the candidate school bus comprises:
using the image data to determine that the vehicle substantially fills a predetermined bounding box without exceeding the predetermined bounding box; and
based on the determination that the vehicle substantially fills the predetermined bounding box without exceeding the predetermined bounding box, selecting the vehicle to be the candidate school bus.

19. The non-transitory computer readable medium of claim 18, the functions further comprising:
before comparing the estimated size of the vehicle to information indicative of the size of a school bus, the one or more processors determining the estimated size of the vehicle based on a size of the predetermined bounding box.

20. The non-transitory computer readable medium of claim 17, wherein the computing system is configured to control an autonomous vehicle operating in the environment, the functions further comprising:

based on the vehicle being representative of the given school bus, providing instructions to control the autonomous vehicle in the environment.

* * * * *